Aug. 28, 1956

R. K. WOLKE ET AL 2,760,254

ELECTRODE LOADING APPARATUS

Filed April 1, 1952

Fig_12

Fig_17

INVENTORS
FRANK J. PILAS
JOHN A. CHASE &
ROY K. WOLKE
BY
William A. Zalesak
ATTORNEY Aug. 28, 1956         R. K. WOLKE ET AL         2,760,254
                  ELECTRODE LOADING APPARATUS
Filed April 1, 1952                    6 Sheets-Sheet 6

INVENTORS
FRANK J. PILAS
JOHN A. CHASE &
ROY K. WOLKE
BY
William A. Balesak
ATTORNEY United States Patent Office 2,760,254
Patented Aug. 28, 1956

2,760,254

ELECTRODE LOADING APPARATUS

Roy K. Wolke, Maplewood, John A. Chase, Nutley, and Frank J. Pilas, Kearny, N. J., assignors to Radio Corporation of America, a corporation of Delaware Application April 1, 1952, Serial No. 279,804

13 Claims. (Cl. 29—25.19)

The present invention relates to an apparatus for automatic assembly of electron tube parts, and more particularly to an apparatus for automatically loading an electrode to a mounted position for incorporation in an electrode cage constituting a sub-assembly of an electron tube.

The fabrication of electron tubes usually involves first a preparation of sub-assemblies and then an arrangement of the sub-assemblies in predetermined relation and fixing the same to provide an electron tube. The sub-assemblies usually comprise an electrode cage, a stem including lead-in wires, and a bulb having an open end. The procedure in arranging these sub-assemblies to form an electron tube usually involves first fixing the electrode assembly to the lead-ins or other support parts on the stem to form a mount. The mount is then extended into the open end of the bulb until the stem thereof is adjacent said open end. The stem is then sealed across the open end of the bulb. An exhaust tubulation is provided either at the closed end of the bulb or in the stem, through which the interior of the enclosure formed by the bulb and stem is evacuated. After evacuation, the exhaust tubulation is pinched off to effectively seal the enclosure from the atmosphere. This completes the manufacture of an electron tube except for certain finishing operations, such as fixing a base to the stem required in some types of tubes, and aging and testing.

One type of sub-assembly includes two spaced insulating plates between which are mounted electrodes including a sleeve-type cathode having an electron emitting coating thereon.

Several problems are involved in mounting cathode sleeves in desired position by mechanized means. One problem concerns the continuity of a loading operation. Such continuity depends upon the storage space provided by the loading means. It will be appreciated that where the storage space is relatively large, interruptions in the loading operation, as by replenishing the supply of parts, are reduced.

Another problem is presented by reason of the relatively fragile character of cathode sleeves as a consequence of which care is required to prevent impairment of the sleeves and of the emitting coating thereon.

A further problem is involved in mounting the cathode sleeve in said desired position by mechanized means. For example, one type of mechanized loading means includes a stationary feeding end for loading movable jigs, successively movable into sleeve receiving relation with respect to the feeding end. This sleeve receiving relation usually involves placement of the jig in a position below and spaced from the feeding end referred to. This spaced position of the jig creates a problem of accurate sleeve transfer from the storage space referred to, to the jig. This problem arises, for example, when the jig has been distorted and bent slightly out of position, a common occurrence in high speed mass production operation.

Various attempts have been made heretofore to overcome the difficulties outlined above. However, devices embodied in such attempts have been unsatisfactory for high speed mass production because of defects in storing and feeding of the electrode cage elements. In mass production of electrode cages, it is generally desired to assemble approximately 2000 to 3000 units per hour without any interruption in the assembly procedure, such as for replenishing of electrode part supplies. In most prior art devices, only a relatively small number of units can be assembled without halting the machinery and replenishing supplies of parts or work pieces. In addition, the problem of continuous accurate mounting of work pieces is not completely solved in the prior art.

Accordingly, one important object of this invention is to provide an improved apparatus for loading an electrode cage element onto a jig mandrel.

Another object is to provide improved means for transferring a sleeve-type electrode from a reservoir to a mandrel of an assembly jig.

Another object is to provide such an apparatus which provides improved accuracy in registering an electrode with a jig mandrel.

A further object is to provide such an apparatus having improved continuity in the loading of work pieces.

Another object is to provide such an apparatus for loading a cathode sleeve on a jig mandrel with reduced danger of impairing the sleeve or its emitting coating.

According to the invention, a cathode loading or mounting apparatus includes a housing provided with a relatively large capacity reservoir or hopper which can be filled with work pieces, such as coated cathode sleeves, while the apparatus is in operation. The housing also includes a feeding mechanism comprising a drum type member having peripheral slots or grooves in which work pieces are automatically positioned. The feeding mechanism cooperates with an auxiliary mechanism to feed work pieces from the reservoir onto a plurality of supports or jigs. The jigs are provided with mounting mandrels and are carried by a conveyor which indexes the jigs successively into operative position for loading. The auxiliary mechanism includes a positive positioning and locking means for each jig in proper position for loading. The auxiliary mechanism also includes a movable guiding means for accurately guiding work pieces onto the proper jig mandrel.

Further objects and advantages of the invention will become manifest as a more detailed description thereof, taken in connection with the appended drawings, proceeds.

Figure 1:
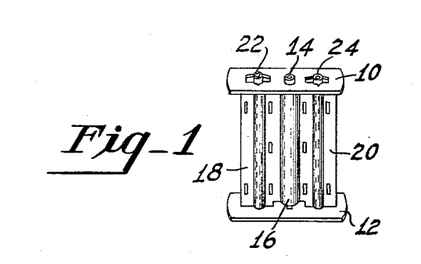
Figure 1 is a perspective view of an electron tube cage having a cathode sleeve assembled by the apparatus of the invention.

Referring to the drawings in more detail, there is shown in Figure 1, an electron tube sub-assembly known as an electrode cage. The sub-assembly includes upper and lower insulating spacer plates such as mica spacer discs or plates 10, 12, between which are supported a group of electrodes comprising, for example, a cathode sleeve 14 and a tubular anode 16 having channelled side wings 18, 20. An apparatus including a cathode assembling mechanism for assembling these parts is described in detail in copending application of Chase et al., Serial Number 218,838, filed April 2, 1951, and assigned to the same assignee as the present application. The present invention constitutes an improvement in said apparatus and concerns in particular an improved cathode sleeve loading apparatus. It will be apparaent that the principles of the invention may be employed to assemble parts other than a cathode.

The cage assembling apparatus in general

Figure 2:
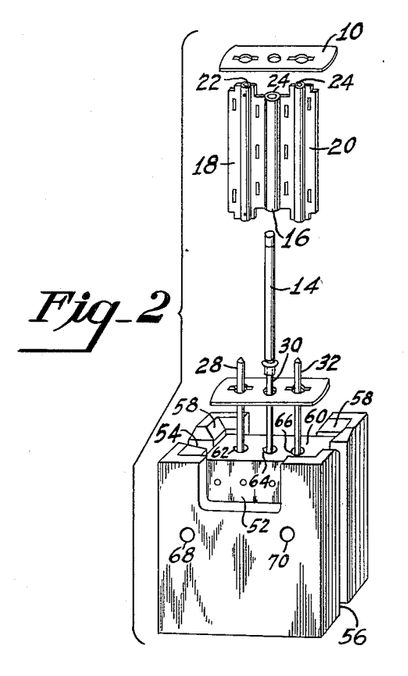
Figure 2 is an exploded view of the electrode cage shown in Figure 1, and shows the parts of which the cage is comprised, as well as one form of a support or jig that the apparatus of the invention may employ.

The apparatus for assembling the electrode cage parts referred to is mounted on a table 25 and includes a plurality of supports or jigs 26, one of which is shown in Figure 2. At a first feeding station (not shown), the spacer plate 12 is automatically loaded on the jig, with the mandrels 28, 30, 32 entering three apertures provided in the plate. The plate falls onto the surface 60 of the jig. Thereafter, the cathode sleeve 14 is automatically loaded on the jig by threading the sleeve on the mandrel 30. The anode 16 is then automatically loaded on the jig, with mandrels 28, 32 entering the channels in the wings 18, 20 and the anode proper telescoping around the cathode sleeve 14. The other spacer plate 10 is finally automatically loaded on the jig with the apertures in the plate receiving the upper end portion of cathode sleeve 14 and the upper ears 22, 24 of the anode. Pressure is then automatically applied to the upper plate 10 to cause the ears on the anode, and the end portions of the cathode sleeve, to enter the apertures in both plates 10, 12. The sizes of the apertures in each plate are such that the plates receive the cathode sleeve and the anode ears in relatively snug fits. Additional means, such as dimples on the electrode parts may be used to hold the parts together. The resultant electrode cage is therefore effectively held together as a unit.

Figures 3, 4, 5, 6, 7:
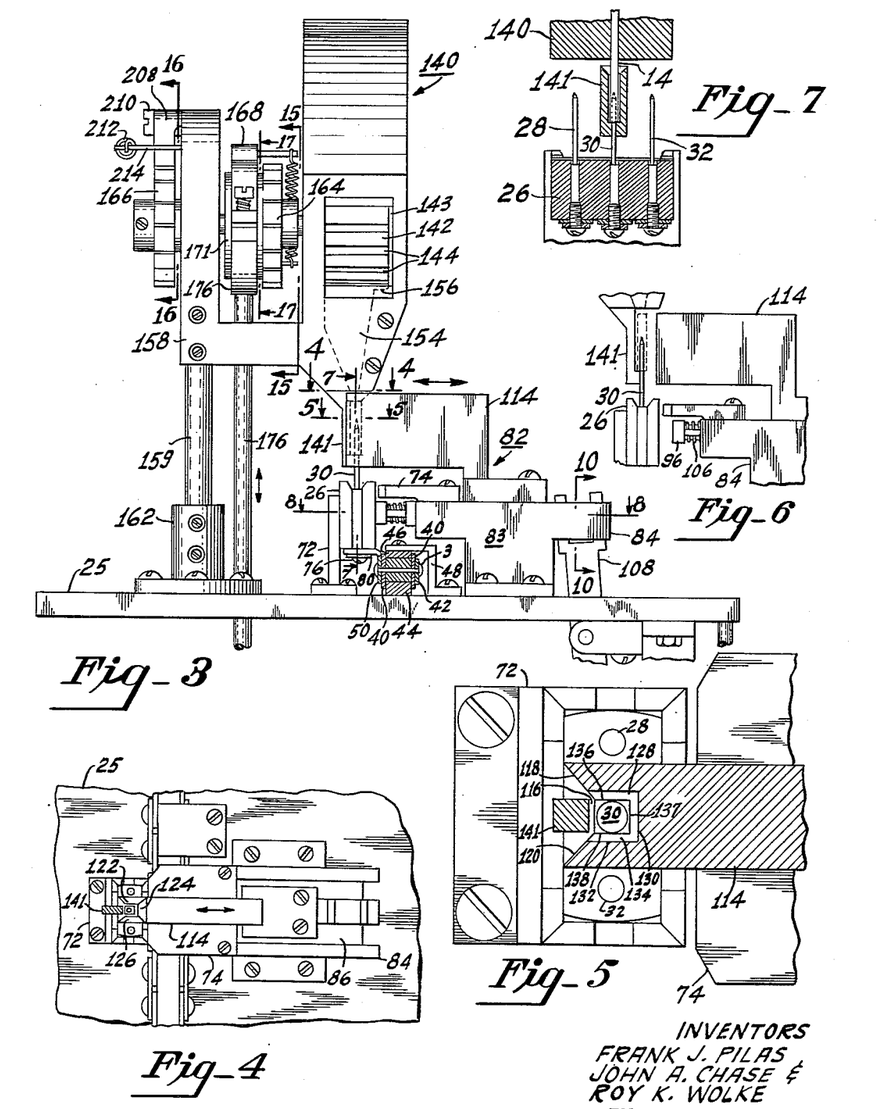
Figure 3 is a side view, partly in section, of the apparatus of the invention.
Figure 4 is a plan view, partly in section along the line 4—4 of Figure 3 and shows the auxiliary mechanism of the apparatus of the invention.
Figure 5 is an enlarged plan view, partly in section, along the line 5—5 of Figure 3.
Figure 6 is a side view of a portion of the auxiliary mechanism.
Figure 7 is an enlarged sectional view along the line 7—7 in Figure 3 and shows the jig delivery end of the loading means in cooperative position.
Figure 11:
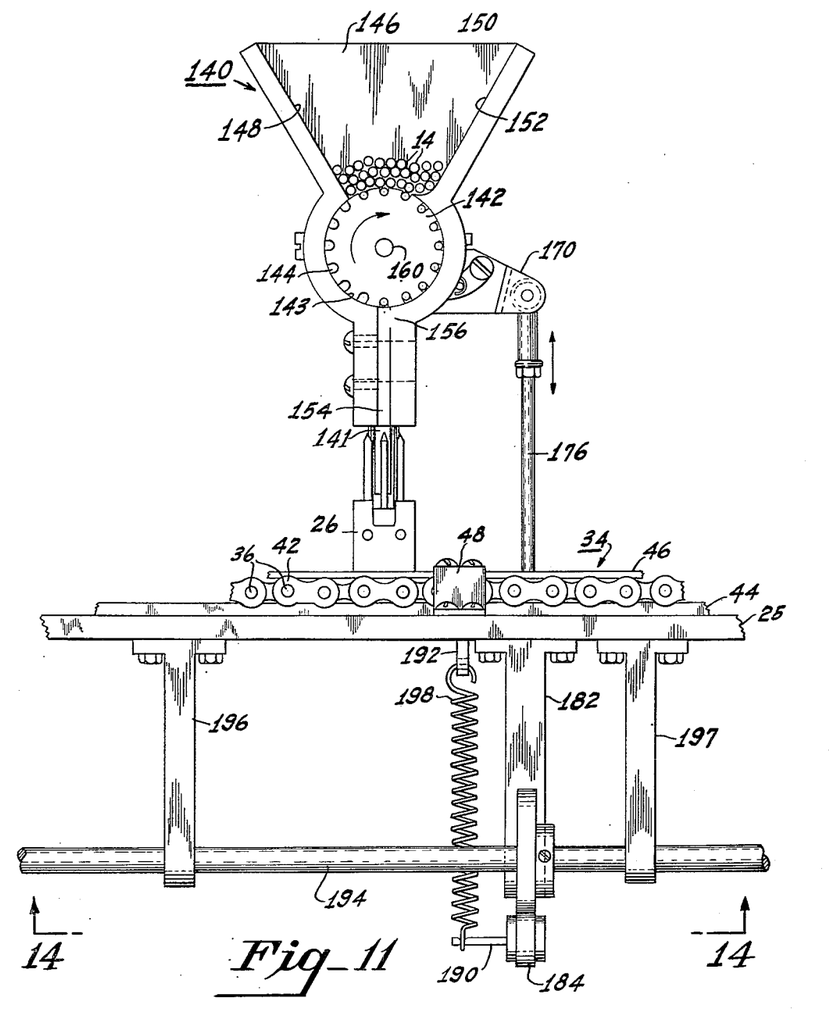
Figure 11 is an elevational view of the cathode sleeve loading mechanism of the invention and a jig carried by a conveyor means positioned in operative relation with the loading mechanism.

The jig 26 is carried to each operating station by a conveyor chain 34 which includes links comprising pins 36, sleeves 38, and side plates 40, 42, through which the pins extend (Figures 3 and 11). The plates referred to are larger than the transverse area of the sleeves, so that a space is provided between the plates 40, 42 and above and below the sleeves referred to. For guiding the chain in its travel adjacent the upper surface of the table 25, a lower guide 44 fixed to the table 25 is provided for extension into the lower space between plates 40. An upper guide 46, fixed to the table by a bracket 48, is disposed to extend into the upper space between the plates 40. The guides 44, 46 bear slightly against the sleeves 38 and the inner walls of plates 40 to restrain the chain against movements in vertical and horizontal directions other than its direction of travel. Some of the plates 42 are in the form of brackets 50, as shown in Figure 3, for supporting the jigs of the apparatus.

The cathode loading apparatus of the invention includes a plurality of support members or jigs having mandrels for receiving electrode cage components; an auxiliary mechanism including a jig locking mechanism and a cathode sleeve guiding member for guiding the travel of a cathode during a loading operation; a housing having a reservoir for storing cathode sleeves, a feeding mechanism for feeding cathode sleeves from the reservoir, and another guide means for guiding the travel of the cathode; and drive means for driving the feeding mechanism.

Jigs for receiving electrode gage elements

A plurality of jigs may be fixed to the chain to provide mass production of electrode cages. A suitable jig 26 for use in the apparatus is shown in Figure 2. The jig comprises a block having sides cut away as at 52 and grooves 54, 56 for cooperating with one of the loading mechanisms in the previously referred to application. The upper portion of the jig includes a recess defined by bevelled walls 58 and having a bottom surface 60. The bottom surface 60 is provided with recesses 62, 64, 66 from which the three mandrels 28, 30, 32 extend upwardly. The recesses referred to as well as the bevelled walls 58, are provided to facilitate the loading operation on the jig. The jig also has two openings 68, 70 in a side thereof adapted to receive portions of the locking mechanism to be described. As shown in Figure 3, the jig 26 is supported on bracket 50 which is substituted for one of the plates 42 forming the endless chain 34.

The jigs are restrained in movement transversely of the path of travel of the chain 34 by means of a guide block 72. This guide block also cooperates with the jig locking mechanism to be described, for correctly positioning the jig with respect to the loading mechanism of the invention. A further jig positioning means in the form of a guide plate 74 is mounted on the jig locking mechanism referred to and aids in maintaining the jig in proper vertical alignment.

A resilient support for the jigs 26 is provided. This is shown in Figure 3. Each of the jigs 26 is supported on a bracket 50 by means of a screw 76 extending through an oversize opening in the bracket. A washer 80 of resilient material, such as rubber, is interposed between the head of the screw 76 and the bracket 50.

This resilient mounting of the jigs is advantageous in correctly positioning a jig in accurate registry with the cathode loading mechanism of the invention. Thus when slight inaccuracies in the chain 34 dispose the jig out of registry with the loading mechanism, the jig is permitted relative movement with respect to the chain when acted on by the positioning and locking mechanisms to be described. This relative movement is important, since the chain 34 may be incapable of movement during stationary portions of its cycles of operation to permit correction, by the auxiliary mechanism, of a faulty registry.

Auxiliary mechanism

An auxiliary mechanism 82 includes a jig locking mechanism 83 for locking each successive jig in sleeve mounting position at the cathode feeding station. The auxiliary mechanism also includes a cathode sleeve guide member which moves, with the locking mechanism, into cooperative relation with a guide member provided on the housing whereby a closed guide path is provided for the cathode in moving from the reservoir to the support jig.

Figure 8:
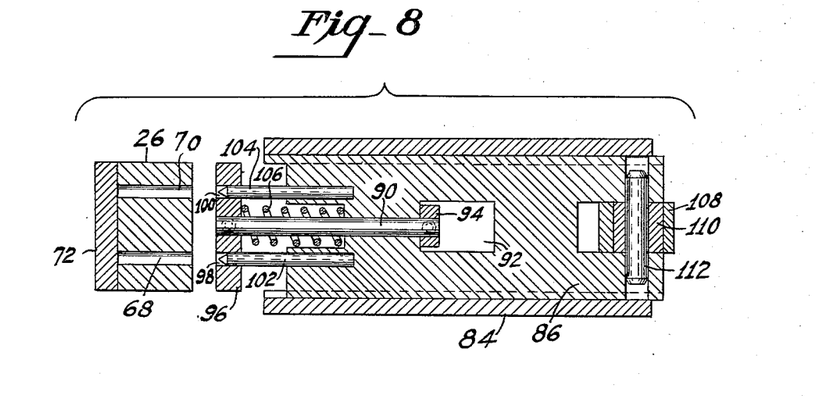
Figure 8 is a sectional view along the line 8—8 of Figure 3, and shows the positioning and locking means in position during a feeding operation, the mechanism being shown in locked position.
Figure 9:
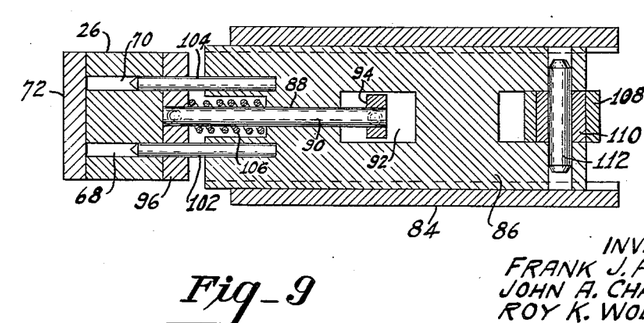
Figure 9 is similar to Figure 8 except that the locking mechanism is shown in unlocked position.
Figure 10:
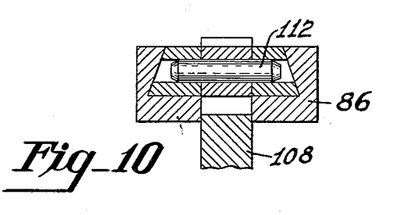
Figure 10 is a sectional view along the line 10—10 of Figure 3 and shows a feature of the locking mechanism.

Referring particularly to Figures 8, 9, 10, the jig locking mechanism 83 of the auxiliary mechanism 82 includes a housing 84 fixed to the table 25 adjacent the cathode sleeve loading mechanism. Within the housing 84 is disposed a slide 86 having a passageway 88 for receiving a rod 90. The housing 84 also includes a chamber 92 for receiving a nut 94 fixed to one end of the rod 90. The chamber 92 is of sufficient length to permit clearance for the nut 94 during longitudinal movement of rod 90 in the passageway referred to in the slide 86.

At the other end of rod 90 is fixed a plate 96 having apertures 98, 100 through which pins 102, 104 fixed to slide 86 are adapted to extend. Embracing the rod 90 at a portion thereof intermediate the plate 96 and the slide 86, is an urging means, such as a coiled spring 106, for urging the plate 96 away from the slide with the remote face of the plate extending beyond the ends of the pins 102, 104.

The pins 102, 104 are adapted to extend into the passageways 68, 70 in the jig 26, when the slide 86 is moved to the left as viewed in Figure 8, for locking the jig in a desired position with respect to the loading or feeding mechanism. Before the pins 102, 104 enter the passageways in the jig, the plate 96 is first caused to bear against the jig as a result of the force of spring 106, to cause the jig to abut against the guide block 72. After the pins have entered the passageways referred to, the plate 96 continues to urge the jig against the guide 72, to contribute to an accurate positioning of the jig. During a disengaging movement of slide 86 to the right as viewed in Fig. 9, causing the pins 102, 104 to be pulled out of the passageways in the jig, the plate 96 continues to bear against the jig, to prevent the pins from pulling the jig with them.

For causing sliding movement of slide 86 in housing 84, a forked lever 108 (Figures 3, 8, 9, 10) is provided actuated by a suitable power transfer means. The power transfer means is described in detail in the above-identified copending application. Lever 108 embraces a sleeve 110 around pin 112. The pin 112 engages a bearing in the slide 86. Movement imparted to the pin 112 by lever 108 is therefore transmitted to the slide. The slide 86 is dovetailed in a recess in housing 84 for fixed position therein.

Also mounted on the locking and guiding device 82 is a cathode sleeve guide member 114 (Figures 3, 4, 5, 6, 7). Such guide is mounted on the movable slide 86 and moves with the slide so that it cooperates, in a manner to be described below, with a portion of the cathode storing and feeding mechanism. The guide member 114 is provided at its forward end, that is, the end in closest relationship with the feeding mechanism, with a vertical channel 116. The channel 116 is closed on three sides and open on the fourth. The leading portion of the channel is defined by two bevelled surfaces 118 and 120. The channel inwardly of its leading portion, may be formed with straight walls. This arrangement is suitable for most cathode mounting operations. However, if accurate positioning of a very small and thin cathode sleeve is required in a type of operation where the jig or jig mandrel may become misaligned, the channel may be formed as shown in Figures 4, 5, 6, 7. In this latter arrangement, progressing in a vertical direction from a topmost surface of the guide 114, the three walls of the channel have bevelled top surfaces 122, 124, 126. Such bevelled surfaces blend into vertical walls 128, 130, 132 (Figure 5). A shoulder 134 is formed between the aforementioned vertical walls and other more closely spaced vertical walls 136, 137, 138 which extend the remainder of the length of the channel 116.

The three walls of the channel 116 cooperate with a fixed guide member or finger 141 which depends vertically from the housing mechanism referred to and which forms the fourth and closing wall for the channel. This guide finger may be formed integral with the housing of the reservoir and feeding mechanism and is described further below.

In either of the above-described embodiments, the channel 116 is extended vertically sufficiently so that the jig mandrel 30 extends upwardly into the channel. By this expedient, there is a continuous guide path from the cathode storing and feeding device to the jig mandrel and highly accurate positioning of the cathode sleeve results. One particular advantage of the channel having the narrowed portion formed by the walls 136, 137, 138 is that these walls are adapted to come into direct contact with the jig mandrel 30 during the cathode assembly step. In this way, if the mandrel has been bent or distorted in any way, it is returned to its correct position by the pressure exerted by these guide walls. Thus, when the cathode falls into the channel 116, it must fall onto the mandrel 30 and come to rest on the shoulder 134 formed by the walls 136, 137, 138. When the guide member 114 is later retracted the cathode continues its downward travel to the lower spacer plate 12.

*The housing*

Figure 12:
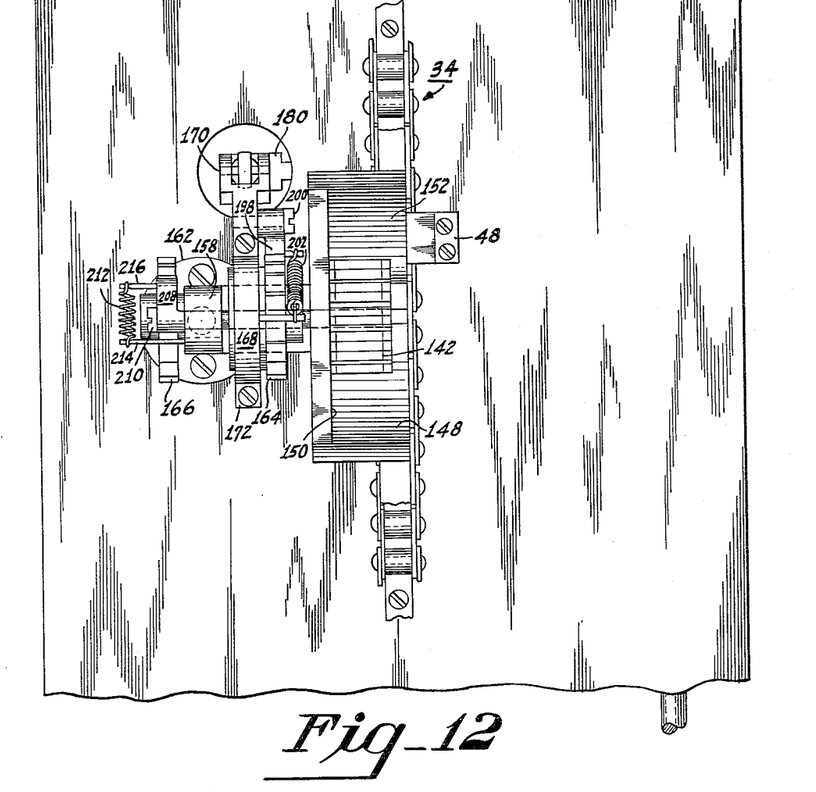
Figure 12 is a top view of the mechanism shown in Figure 11.

A housing 140 (Figures 3, 11, 12) includes a reservoir for containing a quantity of cathode sleeves, a drum feeding mechanism and a guide member for guiding the travel of a cathode sleeve.

The reservoir 146 for the cathode sleeves 14 is defined by housing walls 148, 150, 152. The walls of the reservoir also define an opening through which the reservoir may be replenished or stocked with cathode sleeves at any time during the operation of the loading apparatus without interrupting operations. The cathode sleeves 14 are disposed within the reservoir 146 with their longitudinal axes in a horizontal plane.

The feeding mechanism comprises a drum 142 having peripheral notches or slots 144 adapted to carry the cathode sleeves 14. The drum 142 is mounted within a chamber 143 in the housing and a driving means is provided for rotating the drum in intermittent clockwise and counterclockwise rotation. Such intermittent rotation serves two functions. First, when the drum rotates in one direction, the cathode sleeves are urged to fall into vacant peripheral slots 144 from the reservoir 146. Secondly, when the drum rotates in the opposite direction, a cathode sleeve falls out of a peripheral slot at the delivery end of the drum and is guided onto the jig mandrel. A combination of pawls and ratchet wheels, driven by the main driving mechanism for the entire assembling apparatus, provides the intermittent rotation to the drum. This driving means is fully described below.

Beneath the chamber 143, the walls of the housing 140 define a funnel-like channel 154 and a step 156 is provided on one of the inner walls of the housing at the mouth of the channel 154. The step functions to trip a cathode sleeve 14 from the horizontal to the vertical position as it falls out of the drum groove which lies across the mouth of the channel. The housing has a guide finger 141 which may be integral with the housing and depends vertically therefrom at the bottom of the channel 154. The guide finger 141 cooperates with the movable guide member 114 and provides the fourth and closing wall for the three-walled channel 116 therein. The housing 140 is also provided with a rearwardly extending mounting portion 158 which is fastened to a shaft 159 by set screws or by any other suitable means and the shaft 159 is connected to a flange 162 which in turn is fastened to the table 25.

*Drive means for the drum feeder*

The drum feeding mechanism is rotated intermittently in clockwise and counterclockwise directions by means of a combination of mechanical elements mounted on or connected to a shaft 160. The combination includes a number of pawls and ratchet wheels which are mounted, along with the drum, on the shaft 160. Power is transmitted to this arrangement through a combination of levers and cams which are driven by the main drive means which is fully described in the copending application previously referred to.

Figure 13:
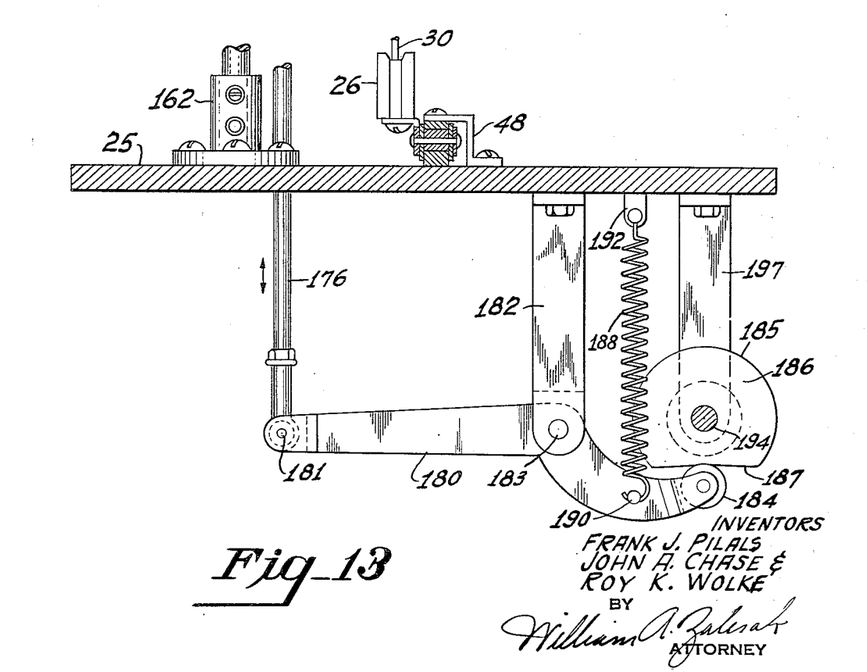
Figure 13 is a side view of the power transfer apparatus for the feeding mechanism.
Figures 14, 15, 16:
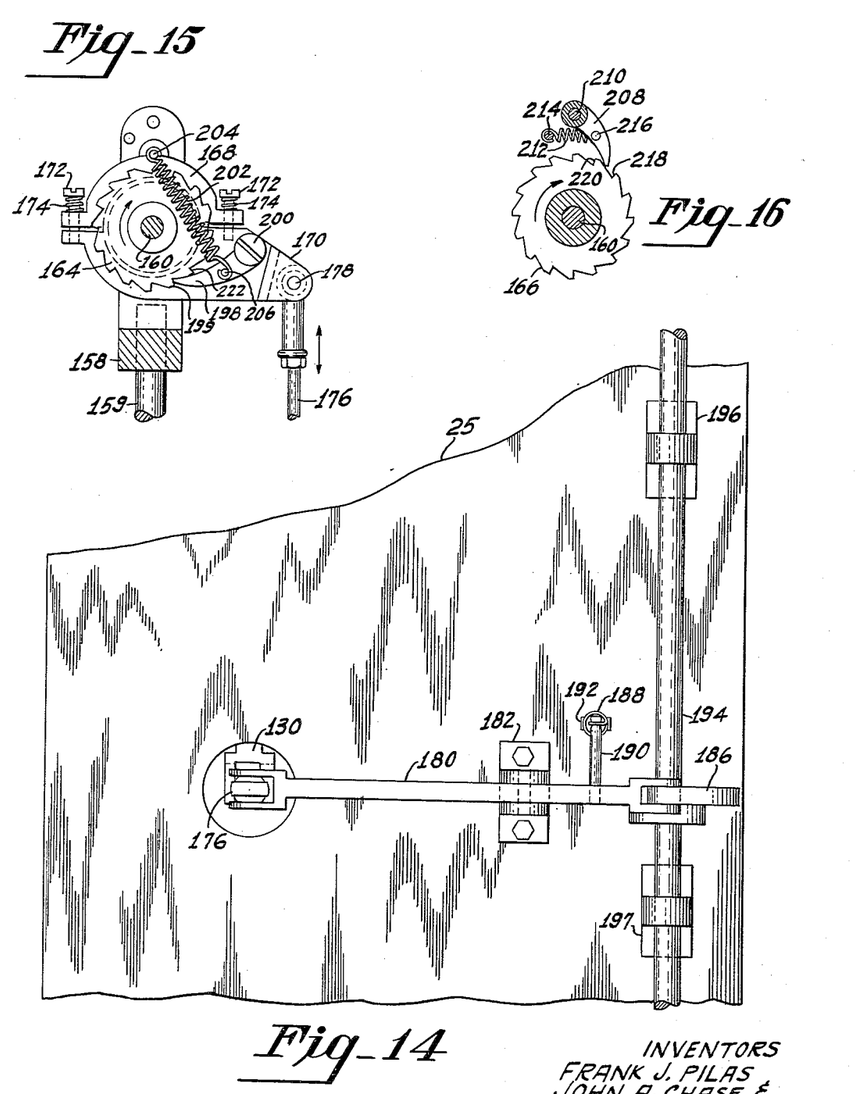
Figure 14 is a view along the line 14—14 in Figure 13, and shows a portion of the power feeding mechanism for the drum drive means.
Figure 15 is a view along the line 15—15 in Figure 3 and shows means for driving the feeding mechanism.
Figure 16 is a view along the line 16—16 in Figure 3, and shows further driving means for the feeding mechanism; and, Figure 17 is a sectional view along the line 17—17 in Figure 3 and shows a portion of the drive means.
Figure 17:
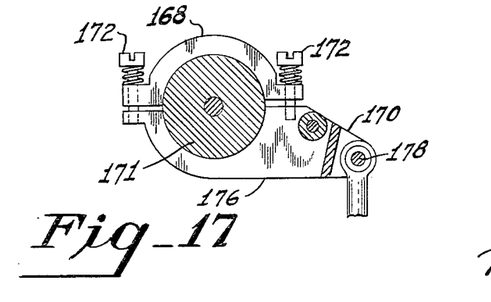

The shaft 160 is rotatably mounted through the housing 140 and the drum 142 is mounted on the shaft 160 and is connected thereto by a set screw or other suitable means. A front ratchet wheel 164 (Figures 12, 15, 16) and a rear ratchet wheel 166 are also mounted on the shaft 160 rearwardly of the housing 140. Between the two ratchet wheels, a double yoke having an upper yoke portion 168 and a lower yoke portion 170 is mounted under spring tension on a bearing 171 fixed to the shaft 160. The upper yoke 168 is fastened under spring pressure to the lower yoke 170 by means of shoulder screws 172 and springs 174. The upper and lower yokes thus retained on the shaft 160 under spring pressure cause frictional drag on the shaft. The lower yoke 170 is linked to a connecting rod 176 by means of a dowel pin 178. The connecting rod, in turn, is similarly joined (Figures 11, 13) to a lever 180 by means of a pin 181 and the lever 180 is pivotally attached to a bracket 182 by means of a pin 183. The bracket 182 is mounted on the underside of the table 25.

On one end of the lever 180 is mounted a cam follower 184 which is urged into engagement with a cam 186 by a spring 188 which is attached to the lever 180 by means of a dowel pin 190 and to a table mounted bracket 192. The cam 186 is mounted on a cam shaft 194 by a set screw or other suitable means. The cam shaft 194 is rotatably mounted in bearing brackets 196, 197 (Figures 11, 14) which are also fastened to the underside of the table 25.

A pawl 198 is rotatably mounted on a shoulder screw 200 which is fastened to the lower yoke 170. The pawl 198 is urged against the front ratchet wheel 164 by a spring 202 which is attached to dowel pins 204, 206. One dowel pin 204 is fastened to the upper yoke 168 and the other pin 206 is fastened to the pawl 198. Another pawl 208, associated with the rear ratchet wheel 166, is rotatably mounted on a shoulder screw 210 which is fastened to the rear portion 158 of the housing 140. The pawl 208 is held in engagement with the rear ratchet wheel 196 by a spring 212. The spring 212 is connected to two dowel pins, one of which 214 is connected to the housing 158 and the other of which 216 is fastened to the pawl 208.

*Operation of the apparatus of the invention*

In operation, the main driving mechanism which is fully described in the above-identified copending application, indexes conveyor chain 34 and one of the jigs carried thereby, for example, jig 26, into operative loading position adjacent the cathode loading apparatus. The jig is locked in position by the locking mechanism 83 previously described.

The main drive mechanism transmits power through a series of mechanical linkages (not shown) to the fork lever 108. The fork is thus urged to the left (Figures 8, 9, 10) and the slide through its direct connection to the fork is also moved to the left. By this action, the rod 90 is urged to insert the pins 102, 104 into the openings 68 and 70 in the jig 26.

Since the guide member 114 is mounted on the slide 86 which carries the jig locking pins 102, 104, that member is also moved into its operative position adjacent to the mandrel 30. This movement of the member 114 brings the three-walled channel 116 therein into cooperative relation with the guide finger 141 which closes the open side of the channel.

During this portion of the operative cycle of the assembling apparatus, i. e. when the jig moves into loading position and is locked there and the guide member 114 moves into cooperative relation with the guide finger 141, the cam follower 184 is riding on the top dwell 185 of the cam 186. During this time the connecting rod 176 does not move up or down and the drum 142 is not rotated.

As the cam shaft rotates in a clockwise direction the cam follower moves onto the lower dwell 187 of the cam 186. During the first 45° of rotation of the cam 186 with the cam follower 184 on the lower dwell 187 thereof, the connecting rod 176 is moved downwardly. As the connecting rod moves down, the pawl 198 pushes the cog 199 of the ratchet wheel 164 in a clockwise direction as indicated by the arrow until a groove 144 in the drum 142 lies across the axis of the funnel 154 of the housing 140 and a cathode sleeve 14 drops through. At the same time, since the ratchet wheel 164 is fastened to the shaft, as the wheel is rotated the shaft will also be rotated in a clockwise direction. Since the rear ratchet wheel 166 is also fastened to the shaft, it will be rotated as the shaft is rotated and in the same direction. This rotation causes the pawl 208 to jump from cog 218 to cog 220.

As the cathode sleeve falls through the funnel 154 it is tipped into a vertical position by the step 156 in the wall of the housing 140 and then it drops through the guide channel formed by the guide member 114 and the guide finger 144 and onto the mandrel 30 in a manner as described above. Finally the slide 86 is retracted to disengage the locking pins 102, 104 from the jig 26 and at the same time the guide member 114 is moved away from the mandrel 30. Thus the cathode-bearing jig is ready to move to the next part mounting station and another jig may move into position adjacent the cathode loading apparatus.

As the cam shaft 194 rotates in a clockwise direction, during the last 45° of rotation of the cam 186 with the cam follower 184 on the lower dwell 187, the cam follower 184 rises toward the top dwell 185 of the cam. In doing so, the lever 180 attached to the cam follower 184 pivots on the dowel pin 183. Thus the connecting rod 176 is moved upwardly. Since the connecting rod is linked to the lower yoke 170, that part will rotate the shaft 160 in a direction opposite to that indicated by the arrow, i. e. counterclockwise, until the cog 220 of the ratchet wheel 166 engages the pawl 208 as shown.

This counterclockwise rotation of the shaft 160 causes the drum 142 to rotate counterclockwise. This rotation of the drum jostles the cathode sleeves 14 in the reservoir 146 and causes certain of them to fall into empty grooves in the drum 142. As the cog 220 of the ratchet wheel 166 engages the pawl 208, the shaft 160 comes to a stop. When the shaft stops rotating, the upper and lower yokes slip on the shaft and continue to rotate in a counterclockwise direction until the pawl 198, connected to the lower yoke 170, jumps over the cog 222 of the ratchet wheel 164. This represents the completion of the upward stroke of the connecting rod 176.

From the foregoing discussion it can be seen that the invention provides an advantageous mechanism for mounting a cathode sleeve in an electrode cage. This mechanism has, as some of its advantages, (1) that a comparatively large supply of work pieces may be stored in readiness for mounting by the feeding means; (2) that the supply of work pieces may be replenished without interrupting the operation of the assembly apparatus; and (3) that the feeding means, by rotating clockwise and counterclockwise intermittently, prevents the supply of work pieces from becoming jammed and insures that they are fed to the support means continuously and smoothly.

What is claimed is:

1. A loading apparatus comprising support means movable intermittently in a predetermined path and adapted to support work pieces after loading, a housing including a reservoir adapted to contain a plurality of work pieces said housing having a delivery end, guiding means between said housing and said support means and adjacent said delivery end, said guiding means being adapted to receive work pieces from said delivery end and to guide said work pieces to said support means, a feeding means in said housing and between said reservoir and said guiding means for feeding said work pieces one at a time to said guiding means, a portion of said guiding means being fixed and adapted to engage one side of a work piece, and another portion of said guiding means being movable into said predetermined path and adapted to engage the other sides of said work piece for laterally enclosing said work piece, said another portion being movable out of said predetermined path, for free intermittent movement of said support means, positioning means adjacent to said path and movable to engage said support means between intermittent movements thereof and to dispose said support means in accurate parts receiving registry with respect to said delivery end, said another portion of said guiding means being fixed with respect to said positioning means and laterally enclosing the path of said work piece from said delivery end to said support means when said positioning means engages said support means, and power transfer means connected to said positioning means for causing said positioning means to engage said support means, whereby said support means is disposed in said parts receiving registry and said another portion of said guiding means laterally encloses said work piece path from said delivery end to said support means.

2. A loading apparatus comprising support means movable intermittently in a predetermined path and adapted to support work pieces after loading; a housing including a reservoir adapted to contain a plurality of said work pieces, said housing having a delivery end and a channel feeding work pieces to said delivery end; guiding means between said housing and said support means and adjacent said delivery end, said guiding means including a member having a channel coaxial with said channel in said housing; a feeding means mounted within said housing for feeding said work pieces one at a time from said reservoir to said support means, said feeding means including a drum having peripheral slots for retaining work pieces therein; drive means connected to said feeding means for imparting successive intermittent clockwise and counterclockwise rotation to said drum, said drive means including a ratchet mechanism connected to said housing and to said feeding means for disengaging said feeding means from said drive means after a relatively short rotary movement of said drum in one direction, and a further ratchet mechanism connected to said feeding means and to said drive means for rotating said drum in the opposite direction in a relatively long movement whereby in said one direction of rotation empty slots are filled by work pieces from said reservoir and in said opposite direction of rotation said slots carrying work pieces are disposed successively across the axis of said channels whereby work pieces drop out of said slots and into said channels; and tripping means between said feeding means and said guiding means for rotating said work pieces into coaxial relation with respect to said channels.

3. A loading apparatus comprising support means movable intermittently in a predetermined path and adapted to support work pieces after loading; a reservoir adapted to contain a plurality of said work pieces; movable guiding means between said reservoir and said support means adapted to guide said work pieces to said support means, said guiding means including two spaced funnel-shaped structures having coaxial channels and a feeding means between said reservoir and said guiding means for feeding said work pieces one at a time to said guiding means, said feeding means including a drum having peripheral slots for retaining work pieces therein, said drum being movable to dispose said slots successively in operative relation with said channels in said guiding means; and driving means for intermittently rotating said drum in successive clockwise and counterclockwise directions, said driving means comprising a shaft, a pair of ratchet wheels mounted on said shaft, a split yoke having an upper yoke portion and a lower yoke portion frictionally mounted on said shaft for relative movement therewith only when movement of said shaft is restrained against movement, a pawl pivotally connected to said lower yoke portion and engaging one of said ratchet wheels on movement of said yoke in one direction for rotating said drum a predetermined distance in said one direction, another pawl pivotally mounted on a support member and engaging the other of said ratchet wheels during a portion only of the movement of said yoke in the opposite direction for rotating said drum a shorter distance in said opposite direction than said predetermined distance, and power transfer means connected to each of said shaft and said movable guiding means for imparting reciprocating motion to said split yoke to release one of said work pieces and for moving said guiding means to receive said one of said work pieces.

4. A loading apparatus comprising a jig having a mandrel for receiving work pieces; a housing for containing said work pieces, said housing having a guide means for guiding said work pieces onto said jig; auxiliary means in operative relation with said jig and said guide member, said auxiliary means including a locking member adapted to engage said jig and lock it in a predetermined position and a guide member mounted on said locking member, said guide member having a guide channel adapted to cooperate with said guide means on said housing.

5. A loading apparatus comprising a jig having a mandrel for receiving work pieces; a housing adapted to contain a plurality of said work pieces, said housing having a guide finger depending vertically therefrom; auxiliary means in operative relation with said jig and said guide finger, said auxiliary means including a locking member adapted to engage said jig and lock it in a predetermined position and a guide member mounted on said locking member, said guide member having a guide channel at one end thereof adapted to cooperate with said guide finger on said housing for guiding work pieces onto said jig.

6. A loading apparatus comprising a jig for receiving a work piece to be loaded; a housing positioned above said jig, said housing having a reservoir for storing work pieces, a drum feeding mechanism for feeding said work piece from said reservoir to said jig, said housing having a funnel portion extending vertically therefrom and a guide finger depending vertically from said housing; drive means connected to said drum feeding mechanism for imparting intermittent clockwise and counterclockwise rotation successively to said drum feeding mechanism; auxiliary means in operative relation with said jig, said auxiliary means comprising a locking member adapted to engage said jig and lock it in a predetermined position and a guide member mounted on said locking member and movable therewith, said guide member having a guide channel defined by three walls and adapted to cooperate with said guide finger on said housing, said finger and said three-walled channel defining a guide path for said work piece to be loaded, said drive means being connected to said locking member, for locking said jig and moving said guide member towards said finger for disposing said channel in alignment with said jig and a work piece dispensed by said feeding mechanism.

7. The apparatus described in claim 6 and wherein said driving means comprises a shaft, a front ratchet wheel and a rear ratchet wheel mounted on said shaft, a first pawl mounted on said housing and connected to said front ratchet wheel, another pawl connected to said rear ratchet wheel, driving means frictionally mounted on said shaft for relative movement therewith and connected to said another pawl, said another pawl being mounted on said driving means, and means for urging said driving means successively in opposite directions, whereby said first pawl is brought into engagement with said front ratchet wheel when said driving means is urged in one direction, and when said driving means is urged in another direction said other pawl is brought into engagement with said rear ratchet wheel.

8. The apparatus described in claim 6 and wherein said driving means comprises a shaft, a front ratchet wheel and a rear ratchet wheel mounted on said shaft, a first pawl mounted on said housing and connected to said front ratchet wheel, another pawl connected to said rear ratchet wheel, driving means frictionally mounted on said shaft, and means connected to said driving means for imparting successively intermittent clockwise and counterclockwise rotations thereto, said first mentioned pawl being mounted to engage its ratchet wheel for stopping the rotation of said shaft when said shaft is driven in one direction, said another pawl being mounted on said driving means for travel with said shaft during said rotation and to engage its ratchet wheel and rotate said shaft in the opposite direction.

9. Apparatus according to claim 6 and wherein said housing includes a chamber, said drum feeding mechanism having peripheral slots therein and being snugly mounted for rotation in said chamber, said chamber having a restricted opening to said reservoir for transfer of work pieces from said reservoir to said slots, said chamber having another restricted opening to said funnel portion for transfer of said work pieces from said drum feeding mechanism to said funnel portion.

10. A loading apparatus comprising a drum rotatable on a horizontal axis, said drum having a plurality of grooves in the periphery thereof extending parallel to the drum axis, a chamber having walls snugly engaging opposite sides of said drum, said chamber defining an opening at the top thereof, a reservoir for elongated work pieces, said opening communicating with said reservoir, means for rotating said drum a relatively short distance in one direction for jostling one of said work pieces into one of said grooves exposed by said opening, said chamber defining another opening at the bottom thereof, and means for rotating said drum in the opposite direction a relatively long distance for registering another one of said grooves having a work piece therein with said another opening for delivery of said work piece through said another opening.

11. A loading apparatus according to claim 10, and wherein said means for rotating the drum a relatively short distance in one direction comprises a shaft fixed to and extending axially through said drum, a lever extending normal to said shaft and frictionally embracing the same, means for rotating said lever a predetermined distance in said one direction about the axis of said shaft, whereby said shaft is rotated in said one direction, a ratchet wheel having a plurality of cogs mounted on said shaft and a pawl mounted on said chamber and engaging said ratchet wheel for locking said ratchet wheel against movement in said one direction, said pawl engaging a portion of said ratchet wheel between two adjacent cogs thereof at the start of a rotation in said one direction, whereby said shaft is rotated in said one direction a distance less than said predetermined distance and until said pawl abuts against one of said adjacent cogs and stops rotation of said shaft, said lever continuing to rotate against the force of its frictional engagement with said shaft to complete travel through said predetermined distance.

12. A loading apparatus according to claim 10 and wherein said means for rotating said drum in said opposite direction comprises a shaft extending axially through said drum, a lever frictionally engaging said shaft, a ratchet wheel having a plurality of cogs fixed to said shaft, a pawl mounted on said lever and engaging said ratchet wheel and means for rotating said lever a predetermined distance in said opposite direction, whereby said pawl is locked into engagement with said ratchet wheel for rotating said ratchet wheel and shaft in said opposite direction said predetermined distance.

13. In a loading apparatus including a loading drum mounted on a shaft extending axially therethrough and a reciprocating driving means for intermittently rotating said drum; the improvement comprising a power transfer mechanism connected between said shaft and driving means, said mechanism including: a ratchet wheel fixed to said shaft and a pawl mounted on said driving means for rotating said shaft a predetermined distance in one direction; a yoke frictionally engaging said shaft and extending to said driving means for rotating said shaft in the opposite direction, and means engaging said shaft for stopping rotation thereof in said opposite direction after said shaft has rotated through a distance less than said predetermined distance, said yoke continuing to rotate in said opposite direction on said shaft against said frictional engagement therewith for completing said predetermined distance in said opposite direction, whereby said drum is jostled by the interrupted rotation thereof in said opposite direction for facilitating receipt of work pieces thereby.

References Cited in the file of this patent

UNITED STATES PATENTS

| 500,511 | Richards | June 27, 1893 |
| 1,325,339 | Swasey | Dec. 16, 1919 |
| 2,155,958 | Schmidt | Apr. 25, 1938 |

FOREIGN PATENTS

| 43,186 | France | Mar. 9, 1934 |
| | (Addition to No. 759,539) | |